US012412687B2

(12) United States Patent
Kokawa et al.

(10) Patent No.: US 12,412,687 B2
(45) Date of Patent: Sep. 9, 2025

(54) RARE-EARTH-BASED MAGNET POWDER, BONDED MAGNET, BONDED MAGNET COMPOUND, SINTERED MAGNET, METHOD OF MANUFACTURING RARE-EARTH-BASED MAGNET POWDER, AND METHOD OF MANUFACTURING RARE-EARTH BASED PERMANENT MAGNET

(71) Applicant: TDK CORPORATION, Tokyo (JP)

(72) Inventors: Ikuya Kokawa, Tokyo (JP); Yoshinori Fujikawa, Tokyo (JP); Kenichi Suzuki, Tokyo (JP); Yasushi Enokido, Tokyo (JP)

(73) Assignee: TDK CORPORATION, Tokyo (JP)

( * ) Notice: Subject to any disclaimer, the term of this patent is extended or adjusted under 35 U.S.C. 154(b) by 80 days.

(21) Appl. No.: 17/695,011

(22) Filed: Mar. 15, 2022

(65) Prior Publication Data

US 2022/0293310 A1 Sep. 15, 2022

(30) Foreign Application Priority Data

Mar. 15, 2021 (JP) ................................ 2021-041368
Dec. 28, 2021 (JP) ................................ 2021-215028

(51) Int. Cl.
*H01F 1/055* (2006.01)
*B22F 9/04* (2006.01)
*H01F 7/02* (2006.01)
*H01F 41/02* (2006.01)

(52) U.S. Cl.
CPC ............ *H01F 1/0557* (2013.01); *H01F 7/02* (2013.01); *H01F 41/0293* (2013.01)

(58) Field of Classification Search
None
See application file for complete search history.

(56) References Cited

U.S. PATENT DOCUMENTS

2013/0009736 A1* 1/2013 Honkura .................. B22F 1/17 252/62.55
2015/0357119 A1* 12/2015 Nagata ............... H01F 41/0293 419/33
2020/0030884 A1 1/2020 Chen et al.

FOREIGN PATENT DOCUMENTS

CN 104889390 A * 9/2015
CN 105405636 A * 3/2016
CN 111326303 A * 6/2020 .............. C30B 1/02
JP 6448405 A * 2/1989
JP H08-111308 A 4/1996
(Continued)

OTHER PUBLICATIONS

Machine translation of CN 111326303A. (Year: 2020).*
(Continued)

*Primary Examiner* — Xiaowei Su
(74) *Attorney, Agent, or Firm* — Oliff PLC

(57) ABSTRACT

The rare-earth-based magnet powder has an average value of 0.65 or more as sphericity P1 defined by an equation (1) of P1=Ls/Ll. In the equation (1), Ll is a length or a long side of a rectangle that circumscribes the rare-earth-based magnet powder in a photomicrograph so that an area of the rectangle is minimized, and Ls is a length of a short side of the rectangle that circumscribes the rare-earth-based magnet powder in the photomicrograph so that the area of the rectangle is minimized.

6 Claims, 10 Drawing Sheets

(56) References Cited

FOREIGN PATENT DOCUMENTS

| | | | |
|---|---|---|---|
| JP | H08-316016 | A | 11/1996 |
| JP | H09-143514 | A | 6/1997 |
| JP | 2004-115921 | A | 4/2004 |
| JP | 2020-504782 | A | 2/2020 |

OTHER PUBLICATIONS

Machine translation of JPS 6448405. (Year: 1989).*
Machine translation of CN 105405636A. (Year: 2016).*
CN-104889390-A machine translation. (Year: 2015).*

* cited by examiner

RARE-EARTH-BASED MAGNET POWDER, BONDED MAGNET, BONDED MAGNET COMPOUND, SINTERED MAGNET, METHOD OF MANUFACTURING RARE-EARTH-BASED MAGNET POWDER, AND METHOD OF MANUFACTURING RARE-EARTH BASED PERMANENT MAGNET

BACKGROUND OF THE INVENTION

The present invention relates to a rare-earth-based magnet powder, a bonded magnet, a bonded magnet compound, a sintered magnet, a method of manufacturing the rare-earth-based magnet powder, and a method of manufacturing a rare-earth-based permanent magnet.

A rare-earth-based permanent magnet is known for having excellent magnetic properties. An R-T-B based permanent magnet having further improved magnetic properties has been developed. The magnetic properties, such as saturation magnetic flux density and coercivity, are ensured by refining a raw material powder subject to sintering so that the powder has a mean particle diameter of about 1-10 μm, when the rare-earth-based permanent magnet is manufactured. However, refining the raw material powder is an obstacle to dimensional accuracy of a green compact and productivity.

The raw material powder is pressure molded in a magnetic field into a green compact. In this molding in the magnetic field, a static magnetic field or a pulse magnetic field is applied to the raw material powder to orient particles of the raw material powder. In this molding in the magnetic field, the finer the raw material powder, the lower the flowability, harming mold-filling ability. With low mold-filling ability of the powder, the powder cannot fill a mold evenly. Consequently, unevenness of the density of the green compact is caused, and dimensional accuracy of the green compact cannot be ensured. It also takes time for the powder to fill the mold, obstructing productivity. It is especially difficult to prepare a green compact having a thin or complex shape accurately and efficiently.

For example, Patent Literature 1 proposes a technology for improving flowability into the mold when the raw material powder is molded, by preparing the raw material powder through fine pulverization of a coarse powder using an airflow crusher after a lubricant is added to the coarse powder. Even with this technology, however, sufficient flowability cannot be ensured, and bulk density of the green compact cannot be sufficiently increased.

Patent Literature 2 discloses a Nd—Fe—B-based alloy spherical magnetic powder prepared using a thermal plasma method. The powder obtained using the method disclosed in this literature has a large mean particle diameter, and an intraparticle structure comprises microstructures having a diameter of 1/10 to 1/100 of the spherical particle diameter. Consequently, an individual magnet powder includes multiple crystal grains inside, and their crystal orientation relations are random, which is unsuitable for manufacture of an anisotropic magnet.

Patent Literature 3 further discloses a technology to obtain a spherical powder having a mean particle diameter of 500 μm or less comprising a structure with a mean crystal particle diameter of 1-30 μm by rapidly cooling and solidifying an alloy molten metal with an inert gas atomization method. As disclosed in this literature, the spherical powder obtained with the gas atomization method tends to be a polycrystal whose internal structure comprises a collection of crystal grains having a particle diameter smaller than that of the spherical powder. When the individual magnet powder includes multiple crystal grains inside, their crystal orientation relations are random, which is unsuitable for manufacture of the anisotropic magnet.

Patent Literature 1: JP Patent Application Laid Open No. H08-111308

Patent Literature 2: JP Patent Application Laid Open No. H09-143514

Patent Literature 3: JP Patent Application Laid Open No. H08-316016

BRIEF SUMMARY OF THE INVENTION

The present invention has been achieved under such circumstances. It is an object of the invention to provide a rare-earth-based magnet powder that has sufficiently increased bulk density and is suitable for manufacture of an anisotropic magnet, and a bonded magnet formed using the powder and a compound for the bonded magnet. It is another object of the present invention to provide a method of easily manufacturing the rare-earth-based magnet powder that has sufficiently increased bulk density and is suitable for manufacture of the anisotropic magnet, and a method of manufacturing a rare-earth-based permanent magnet using the above-mentioned manufacturing method.

To achieve the above object, a rare-earth-based magnet powder according to a first aspect of the present invention is a rare-earth-based magnet powder whose average value of sphericity P1 defined by an equation (1) of $P1=Ls/Ll$ is 0.65 or more. Ll in the equation (1) is a length of a long side of a rectangle that circumscribes the rare-earth-based magnet powder in a photomicrograph so that an area of the rectangle is minimized. Ls in the equation (1) is a length of a short side of the rectangle that circumscribes the rare-earth-based magnet powder in the photomicrograph so that the area of the rectangle is minimized. Further, in the rare-earth-based magnet powder according to the first aspect of the present invention, a quantity proportion of the rare-earth-based magnet powder comprising a single crystal is 65% or more.

The present inventors have found that the magnet powder according to the first aspect can have sufficiently increased bulk density (aerated bulk density and packed bulk density). The present inventors have also found that, when the magnet powder is pressure molded in a magnetic field, despite being a fine magnet powder, flowability is less likely to decrease, and mold-filling ability is improved. Improvement of the mold-filling ability enables the magnet powder to fill a mold evenly, reducing unevenness of the density of a green compact and deformation of a sintered body. Additionally, with reduced interparticle friction in the powder, the crystal orientation of magnetic particles can be increased.

The magnet powder according to the present invention can also have increased crystal orientation in the green compact. In other words, each particle in the magnet powder of the present invention can be easily oriented toward the magnetic field direction. A rare-earth-based permanent magnet having excellent magnetic properties can thus be obtained. Moreover, the magnetic properties of the magnet, such as coercivity (Hcj), can be improved because the quantity proportion of the rare-earth-based magnet powder comprising a single crystal in the first aspect of the present invention is 65% or more.

The quantity proportion of the rare-earth-based magnet powder having a sphericity P1 of 0.9 or more is preferably 30% or more. As long as at least a certain amount of magnet particles having a certain sphericity P1 are included in the raw material powder for filling the mold, effects are exhibited, even if not all magnet particles have a sphericity P1 of 0.9 or more.

To achieve the above object, a re-earth-based magnet powder according to a second aspect of the present invention is a rare-earth-based magnet powder whose average value of sphericity P2 defined by an equation (2) of P2=Lt/Lr is 0.70 or more. Lr in the equation (2) is a perimeter length of the rare-earth-based magnet powder in a photomicrograph. Lt in the equation (2) is a perimeter length of a perfect circle having the same area as that of the rare-earth-based magnet powder in the photomicrograph whose perimeter length Lr is calculated. Further, in the rare-earth-based magnet powder according to the second aspect of the present invention, the quantity proportion of the rare-earth-based magnet powder comprising a single crystal is 65% or more.

The present inventors have found that the magnet powder according to the second aspect can have sufficiently increased bulk density, in the same manner as in the first aspect of the present invention. The present inventors have also found that, when the magnet powder is pressure molded in a magnetic field, despite being a fine magnet powder, flowability is less likely to decrease, and mold-filling ability is improved, in the same manner as in the first aspect of the present invention. Improvement of the mold-filling ability enables the magnet powder to fill a mold evenly, reducing unevenness of the density of a green compact and deformation of a sintered body. The magnet powder according to the second aspect of the present invention can also have increased crystal orientation in the green compact. Further, the magnet powder according to the second aspect of the present invention allows for improved magnetic properties, such as coercivity (Hcj), of a magnet.

The quantity proportion of the rare-earth-based spherical magnet powder having a sphericity P2 of 0.8 or more is preferably 25% or more. As long as at least a certain amount of magnet particles having a certain sphericity P2 are included in the raw material powder before being filled in the mold, effects are exhibited, even if not all magnet particles have a sphericity P2 of 0.8 or more.

The rare-earth-based magnet powder preferably has a mean particle diameter of preferably 20 μm or less, more preferably 10 μm or less, preferably 0.5 μm or more, and more preferably 0.5-10 μm. When the mean particle diameter of the rare-earth-based magnet powder is too large, it is more likely that a gap between the particles is created and the bulk density is reduced. Also, when the mean particle diameter of the rare-earth-based magnet powder is too large, a crystal phase different from the $R_2T_{14}B$ crystal and the like tends to coexist with the $R_2T_{14}B$ crystal and the like in one magnet particle, possibly reducing the magnetic properties after molding. When the mean particle diameter of the rare-earth-based magnet powder is too small, it is likely that agglomeration of the particles occurs more frequently, in which case the bulk density tends to be reduced.

The rare-earth-based magnet powder may include coated particles, which are individual particles each comprising a single main phase grain and having a surrounding surface at least partly covered with a coating layer. An average of coverage ratios indicating a proportion of the surrounding surface of each individual particle covered with the coating layer is preferably 50% or more. The coated particles preferably include entirely coated particles (individual particles each of whose entire surface is covered with the coating layer) having a coverage ratio of 100%. The coating layer preferably comprises a rare-earth rich component having a higher concentration of rare-earth elements than that of the main phase grain.

A sintered magnet obtained by sintering the magnet powder including the coated particles has improved magnetic properties. For example, compared to a sintered magnet that has the same composition and is obtained using a magnet powder manufactured with a conventional pulverization method, in the sintered magnet obtained using the rare-earth-based magnet powder including the coated particles, a subphase (coating layer) is distributed thinly and evenly on a surface of the main phase (main phase grain), thus high coercivity (Hcj) is achieved. Additionally, subphase segregation is extremely reduced and the main phase proportion is raised, which allows for high residual magnetic flux density (Br).

At least a part of the rare-earth-based magnet powder preferably comprises an R-T-B based permanent magnet powder. It is because the R-T-B based permanent magnet powder has excellent magnetic properties.

The bonded magnet according to one aspect of the present invention preferably includes any above-mentioned rare-earth-based magnet powder. The bonded magnet may include resin. The bonded magnet compound (which may include resin or the like) of the present invention preferably includes any above-mentioned rare-earth-based magnet powder. Using the above rare-earth-based magnet powder as the raw material powder of the bonded magnet (e.g., raw material powder included in the bonded magnet compound) allows for high filling rate and high crystal orientation, achieving the bonded magnet having high Br.

In a cross section of the rare-earth-based sintered magnet according to one aspect of the present invention, a main phase and a subphase are observed, and an area proportion of the subphase is 2% or less. The main phase is preferably $R_2T_{14}B$ crystal. In the sintered magnet according to another aspect of the present invention, the crystal orientation calculated by dividing residual magnetic flux density in an orientation direction by saturation magnetic flux density is preferably 94% or more.

In the rare-earth-based sintered magnet according to one aspect of the present invention, the crystal orientation of the main phase and the residual magnetic flux density are improved. Additionally, with the subphase distributed on the surface of the main phase, the coercivity of the sintered magnet is improved. Although the subphase tends to be distributed unevenly in between the main phase and another main phase, reducing the area proportion of the subphase can prevent reduction of the residual magnetic flux density. Reduced uneven distribution of the subphase component in the sintered body in the sintered magnet thus allows for high residual magnetic flux density and high coercivity at the same time.

A method of manufacturing the rare-earth based magnet powder according to one aspect of the present invention comprises steps of obtaining a raw material powder by pulverizing an alloy having a desired composition, and feeding the raw material powder into a thermal plasma to heat the raw material powder and then rapidly cooling the heated powder so that a spheroidized powder is obtained. Using the thermal plasma method, preferably a high frequency induction thermal plasma method, makes it possible to spheroidize the rare-earth-based magnet powder while preventing contamination by impurities. When the method of the present invention is used, it is easier to obtain the spheroidized powder having a mean particle diameter of preferably 20 μm or less, more preferably 10 μm or less, and preferably 0.5 μm or more.

The raw material powder is preferably fed into a flame tip of the thermal plasma. The temperature of the flame tip of the thermal plasma is, for example, 2000-5000K, which is slightly low as the thermal plasma. Feeding the raw material powder (alloy powder) into the area can prevent nanonization due to vaporization and coarsening due to excessive melting, which makes it possible to obtain the spheroidized powder having a particle diameter similar to that of the fed raw material powder. By using this manufacturing method, it is further possible to easily obtain the powder having the quantity proportion of the rare-earth-based magnet powder comprising a single crystal of 65% or more and to improve the magnetic properties, such as the coercivity (Hcj), of the magnet.

For example, by rapidly cooling the heated powder after the raw material powder is fed into the flame tip of the thermal plasma and heated, each particle of the raw material powder is entirely or partly melted. The powder thus becomes easier to be spheroidized. Also, the component of the subphase becomes easier to be distributed evenly on the surface of the powder, making it easier for spherical coated particles to be formed. The spherical powder tends to allow for improvement of the bulk density and the crystal orientation.

A method of manufacturing the rare-earth based permanent magnet according to one aspect of the present invention preferably comprises steps of obtaining a raw material powder by pulverizing an alloy having a desired composition, feeding the raw material powder into a flame tip of a thermal plasma to heat the raw material powder and then rapidly cooling the heated powder so that a spheroidized powder is obtained, and sintering the spheroidized powder to obtain a sintered body. To form the sintered body, the magnet powder including the spheroidized powder preferably goes through sintering after being molded into a predetermined shape by press molding for example.

In using the manufacturing method as above, the spherical powder tends to allow for improvement of the bulk density and the crystal orientation. The magnet after sintering thus tends to have high residual magnetic flux density. The component of the subphase becomes easier to be distributed evenly on the surface of the powder, making it easier for the spherical coated particles to be formed. When the component of the subphase is distributed on the surface of the powder evenly, the subphase is distributed (thinly and) evenly in the two-grain boundary upon densification after sintering. This possibly prevents reduction of the residual magnetic flux density. By using the manufacturing method, it is further possible to easily obtain the powder having the quantity proportion of the rare-earth-based magnet particles each comprising a single crystal of 65% or more and to improve the magnetic properties, such as the coercivity (Hcj), of the magnet.

BRIEF DESCRIPTION OF THE DRAWING(S)

DETAILED DESCRIPTION OF THE INVENTION

Figure 1A:
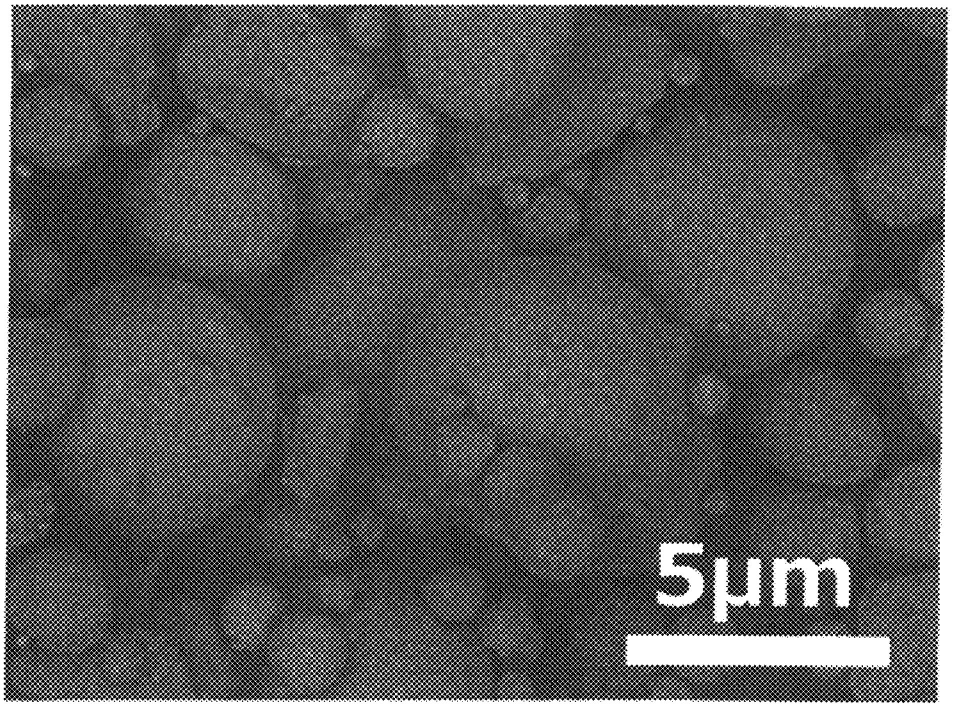
FIG. 1A is a photomicrograph of a rare-earth-based magnet powder according to an example of the present invention.

Hereinafter, the present invention is described based on an embodiment.

An example of a rare-earth-based magnet powder according to an embodiment of the present invention is an R-T-B based magnet powder. R represents at least one rare-earth element. T represents an iron group element. B represents boron.

Rare-earth elements mean Sc, Y. and lanthanide elements in group 3 of the long period type periodic table. The lanthanide elements include La, Ce, Pr, Nd, Sm, Eu, Gd, Th, Dy, Ho, Er, Tm, Yb, and Lu, for example. The rare-earth elements are classified into light rare-earth elements and heavy rare-earth elements. In the present application, the heavy rare-earth elements mean the rare-earth elements having an atomic number of any of 64-71 (i.e., Gd, Tb, Dy, Ho, Er, Tm, Yb, and Lu), and the light rare-earth elements mean the rare-earth elements other than the heavy rare-earth elements. Y is classified under the light rare-earth elements in the present application. Hereafter, one or more heavy rare-earth elements might be referred to as RH. The R-T-B based magnet powder according to the present embodiment may include the heavy rare-earth element RH.

T representing the iron group element may be Fe alone or may be Fe partly substituted by Co. Substituting a part of Fe by Co allows for improvement of temperature properties and corrosion resistance without reducing magnetic properties.

B representing boron may be partly substituted by carbon. Substituting a part of boron by carbon, or including boron and carbon in the B-site, makes it easier for a thick two-grain boundary between particles to be formed during an aging treatment after the powder is molded into a predetermined shape and then is sintered, and allows for easier improvement of coercivity. The amount of boron substituted by carbon may be about 20 at % or less in entire B included in an $R_2 T_{14} B$ phase observed after sintering.

The R-T-B based magnet powder may include other elements, including Ti, V, Cr, Mn, Ni, Cu, Zr, Nb, Mo, Hf, Ta, W, Al, Ga, Si, Bi, and Sn, for example. The amount of R in the R-T-B based magnet powder is freely determined. The amount of R may be 26 wt % or more, and 33 wt % or less. The amount of B in the R-T-B based magnet powder is freely determined. The amount of boron included as B may be 0.8 wt % or more, and 1.2 wt % or less.

The amount of T in the R-T-B based magnet powder is the substantial remainder of the constituents of the R-T-B based magnet powder. When Co is included as T, the amount of Co may be 3.0 wt % or less with respect to the sum of the amount of the iron group elements. When Ni is included as T, the amount of Ni may be 1.0 wt % or less with respect to the sum of the amount of the iron group elements.

The amount of oxygen (O) in the R-T-B based magnet powder is freely determined. The amount of O may be, for example, 200 ppm or more and 3000 ppm or less. The amount of O is preferably large from the perspective of improving the corrosion resistance, and is preferably small from the perspective of improving the magnetic properties.

The amount of carbon (C) in the R-T-B based magnet powder is freely determined. The amount of C may be, for example, 200 ppm or more to 3000 ppm or less. When the amount of C is not within this range, the magnetic properties tend to degrade. The R-T-B based magnet powder may include carbon by having a part of boron in the B-site of the R-T-B based magnet powder substituted by carbon, for example, as described above.

The amount of nitrogen (N) in the R-T-B based magnet powder is freely determined. The amount of N may be, for example, 200 ppm or more to 1500 ppm or less. When the amount of N is not within this range, the magnetic properties tend to degrade.

To measure the amount of O, C, and N in the R-T-B based magnet powder, a known method can be used. The amount of O is measured, for example, using an inert gas fusion-non-dispersive infrared absorption method. The amount of C is measured, for example, using a combustion in oxygen stream-infrared absorption method. The amount of N is measured, for example, using an inert gas fusion-thermal conductivity method.

As shown in FIG. 1A, most of the particles are spheres in the R-T-B based magnet powder of the present embodiment. In other words, in the R-T-B based magnet powder of the present embodiment, an average value of sphericity P1 defined by an equation (1) of P1=Ls/Ll is 0.65 or more, is preferably 0.7 or more, and is more preferably 0.75 or more. Additionally, the quantity proportion of the particles having a sphericity P1 of 0.9 or more in the magnet powder is preferably 30% or more, more preferably 35% or more, and particularly preferably 40% or more.

Figure 2A:
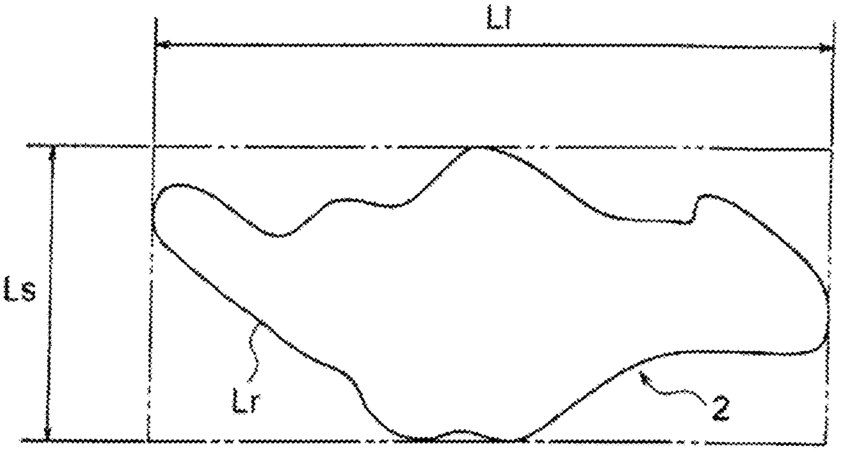
FIG. 2A is a schematic diagram for calculating sphericity of a particle.

Ll in the equation (1) is a length of a long side of a rectangle that circumscribes each particle 2 in the R-T-B based magnet powder in a photomicrograph, for example shown in FIG. 2A so that the area of the rectangle is minimized. Ls in the equation (1) is a length of a short side of the rectangle that circumscribes each particle 2 in the R-T-B based magnet powder so that the area of the rectangle is minimized in the photomicrograph.

The R-T-B based magnet powder shown in FIG. 1A is put into a resin and is hardened, and then cut. The cut cross section is polished and is observed using SEM.

This cross-sectional SEM image, for example, may be the photomicrograph. At least 100 magnet particles are observed in this cross section. Mean values (Ll, Ls) of these randomly selected 100 particles are calculated. The quantity proportion (number density) of the particles having a predetermined sphericity is calculated by measuring P1 of each of the randomly selected 100 particles and then finding the quantity proportion of the particles having a sphericity P1 of 0.9 or more in the magnet powder among the 100 particles.

From another perspective, in the R-T-B based magnet powder of the present embodiment, an average value of sphericity P2 defined by an equation (2) of P2=Lt/Lr is 0.70 or more, is preferably 0.73 or more, and is more preferably 0.75 or more. Additionally, the quantity proportion of the particles having a sphericity P2 of 0.8 or more in the magnet powder is preferably 25% or more, more preferably 30% or more, and particularly preferably 35% or more.

Figure 2B:
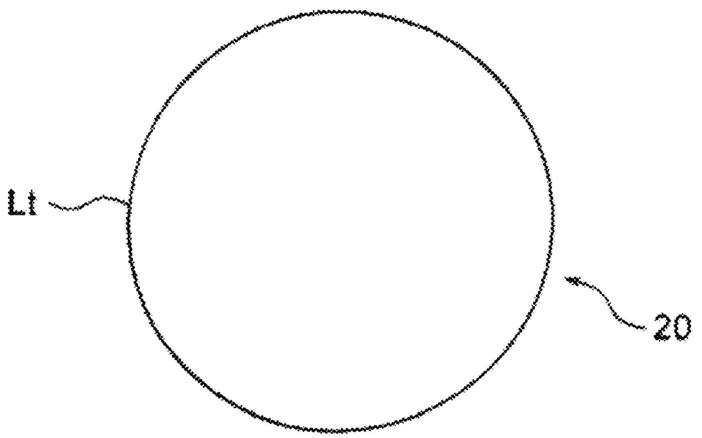
FIG. 2B is a schematic diagram showing a perfect circle having the same cross-sectional area as that of the particle shown in FIG. 2A.

Lr in the equation (2) is, in a photomicrograph for example, a perimeter length of each particle 2 in the R-T-B based magnet powder in FIG. 2A. Lt in the equation (2) is a perimeter length of a perfect circle 20 shown in FIG. 2B having the same area as that of the particle 2 whose perimeter length Lr has been calculated using the photomicrograph. A method of obtaining a photomicrograph, a method of calculating the averages, and a method of calculating the quantity proportion of the particles the having the predetermined sphericity, and the like are the same as those in the above-mentioned equation (1). Regarding sphericity P2, the quantity proportion of the particles having a sphericity P2 of 0.8 or more in the magnet powder is calculated.

A mean particle diameter of the R-T-B based magnet powder of the present embodiment is preferably 20 μm or less, is more preferably 10 μm or less, is preferably 0.5 μm or more, and is more preferably 0.5-10 μm. To calculate the mean particle diameter of the R-T-B based magnet powder, a circle equivalent diameter of each particle in the above-mentioned photomicrograph is calculated, and then a mean circle equivalent diameter is calculated as the mean of at least 100 particles' diameters. Another method to measure the mean particle diameter may be, for example, a light scattering using a laser diffraction particle size analyzer.

When the mean particle diameter of the R-T-B based magnet powder is too large, a void between the particles is easily created, and bulk density is easily reduced. Also, when the mean particle diameter of the rare-earth-based magnet powder is large, a crystal phase different from the $R_2T_{14}B$ crystal and the like tends to coexist with the $R_2T_{14}B$ crystal and the like in one magnet powder, possibly reducing the magnetic properties. For example, when the mean particle diameter is large, the crystal phases other than main phase are more likely to coexist. Additionally, the larger the particle diameter is, the smaller the coercivity tends to be. When the mean particle diameter of the rare-earth-based magnet powder is too small, it is easier for agglomeration of the particles to occur more frequently, in which case the bulk density tends to be reduced.

Figure 5A:
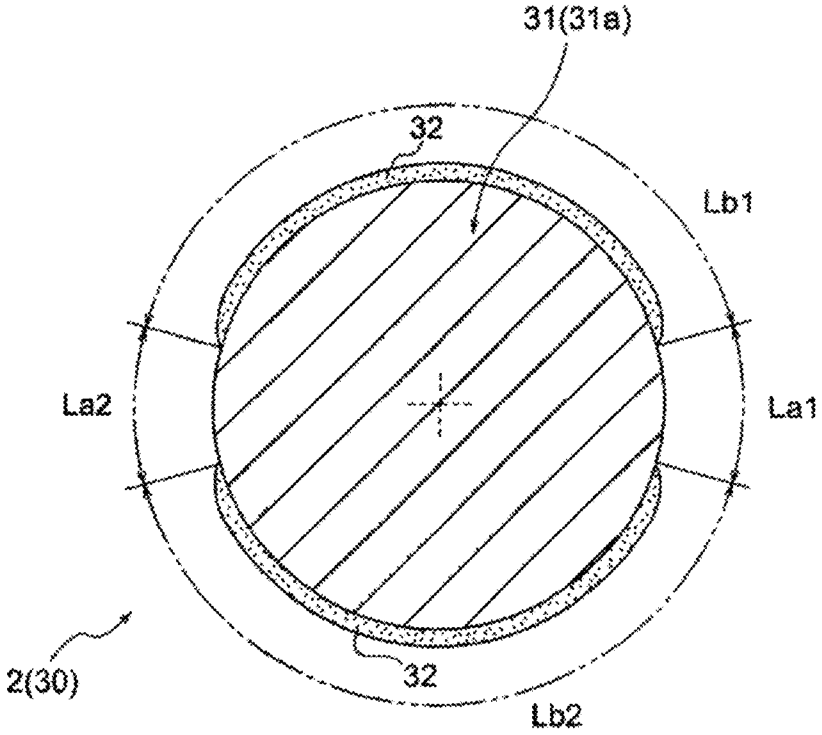
FIG. 5A is a schematic diagram for calculating a coverage ratio of a particle shown in FIG. 1A.

For the most part, each particle 2 in the R-T-B based magnet powder of the present embodiment comprises a coated particle 30 having a cross section with a substantially circular shape as shown in FIG. 5A. The coated particle 30 comprises an individual particle 31 mainly comprising a single main phase grain 31*a*. At least a part of a surrounding surface of the individual particle 31 is coated with a coating layer 32. The main phase grain 31*a* comprises a single crystal (e.g., $R_2T_{14}B$ crystal).

The quantity proportion of the main phase grains 31*a* comprising a single crystal included in the R-T-B based magnet powder in the present embodiment is 65% or more, is preferably 70% or more, and is more preferably 75% or more. The single crystal particles have relatively high crystal orientation compared to that of a polycrystal particle. Including those particles in a manufactured bonded magnet or sintered magnet thus makes it easier to improve Br of the magnet.

To determine whether the particle 2 is a single crystal, a cross section of the particle is exposed and evaluated using an apparatus such as an electron backscatter diffraction (EBSD) analysis apparatus attached to an FE-SEM apparatus. The quantity proportion is calculated through the evaluation of randomly selected 100 particles, for example. Specifically, the quantity proportion of the particles each having a single crystal face in an image captured using the EBSD analysis apparatus is calculated.

At least a part of the surrounding surface of the main phase grain 31*a* comprising a single crystal included in the R-T-B based magnet powder in the present embodiment is preferably coated with the coating layer 32 as shown in FIG. 5A. The coating layer 32 comprises a rare-earth rich component having a higher concentration of rare-earth elements than that of the main phase grain. The coating layer 32 is thin, having a thickness of about 10-200 nm. The coated particle 30 has a mean particle diameter within the above-mentioned range of the mean particle diameter of the R-T-B based magnet powder.

Figure 5B:
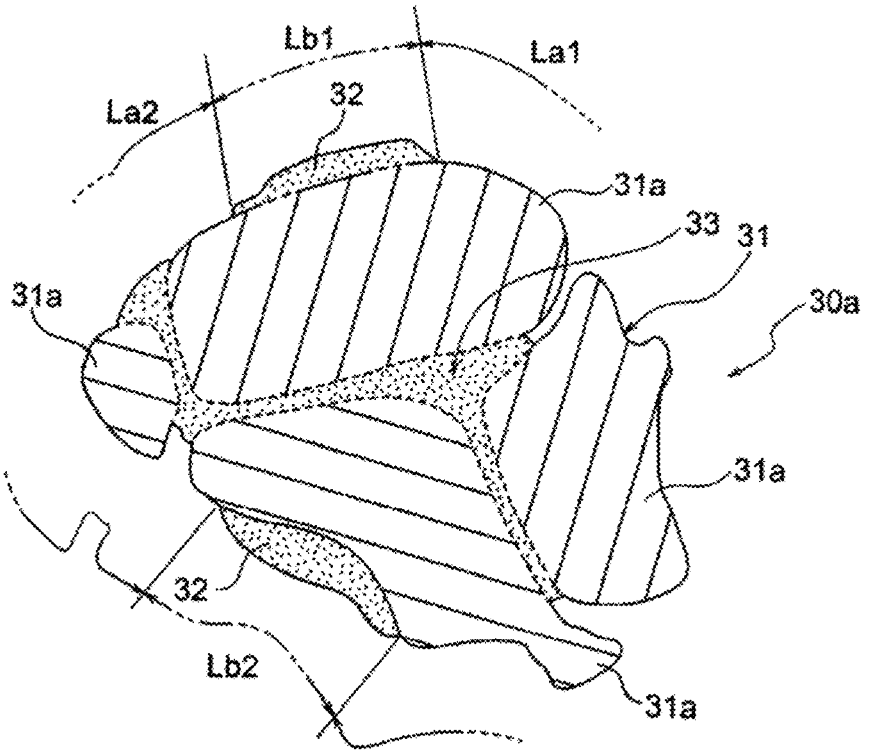
FIG. 5B is a schematic diagram for calculating the coverage ratio of a particle shown in FIG. 1B.

Although multiple main phase grains 31*a* may be joined with a grain boundary phase 33 in the individual particle 31 as shown in FIG. 5B, at least a part of the surrounding surface of a single main phase grain 31*a* in the individual particle 31 of the present embodiment is preferably covered with the coating layer 32.

A coverage ratio indicating the proportion of the surrounding surface of the single main phase grain 31*a* covered with the coating layer 32 has a mean of preferably 50% or more, more preferably 60% or more, and particularly preferably 80% or more in the present embodiment. The higher the mean is of the coverage ratio of the main phase grain 31*a* covered with the coating layer 32 comprising a rare-earth rich component having high magnetic anisotropy, the less likely magnetization reversal in the magnet is to occur, improving Hcj.

The mean coverage ratio can be calculated, for example, as a mean of the coverage ratio values of randomly selected one hundred particles 2. The calculation of the coverage ratio of each particle 2 can be performed as described below, for example. When the individual particle 31 comprises only the single main phase grain 31*a* as shown in FIG. SA, image analysis is performed to find interface lengths Lb1 and Lb2 (circumferential interface lengths) along the circumferential direction of each interface between the outer surface of the main phase grain 31*a* and the coating layer 32 in the cross section of the particle 2.

In the same manner, exposed lengths La1 and La2 (circumferential exposed lengths) along the circumferential direction of the outer surface of the main phase grain 31*a* not coated with the coating layer 32 are calculated through image analysis of one particle 2. A total circumferential length Lt of the main phase grain 31*a* (individual particle 31) is defined as summed length (La1+La2+Lb1+Lb2) of the circumferential exposed lengths La1 and La2 and the circumferential interface lengths Lb1 and Lb2 of one particle 2. The coverage ratio of the particle 2 can be represented by 100×circumferential interface lengths (Lb1+Lb2)/total circumferential length (Lt).

When either one of the circumferential interface length Lb1 or Lb2 (either one of the circumferential exposed length La1 or La2) is available, or when three or more circumferential interface lengths (three or more circumferential exposed lengths) are available, a value of n (an integer of 1 or more) in a total circumferential interface length $\Sigma Lb_n$ (total circumferential exposed length $\Sigma La_n$) increases or decreases.

Figure 5C:
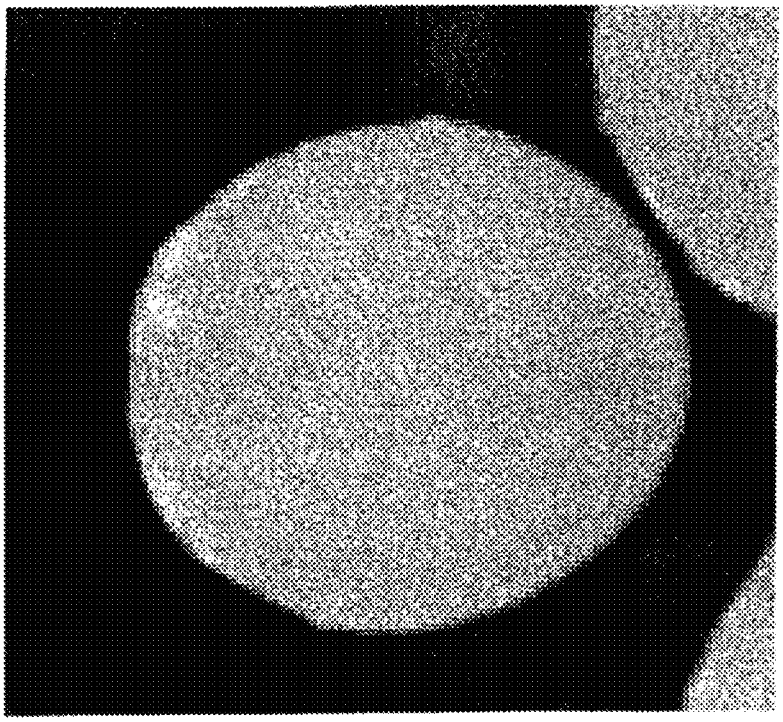
FIG. 5C is a photomicrograph of a cross section of a particle having a coverage ratio of 100% among the particles shown in FIG. 1A.

Randomly selected one hundred particles 2 in the magnet powder in the present embodiment include at least one coated particle whose entire surface is covered at a coverage ratio of 100% (entirely coated particle) as shown in FIG. 5C for example, more preferably include ten or more such entirely coated particles, and still more preferably include thirty or more such entirely coated particles. The larger the number of such entirely coated particles, the higher the mean coverage ratio, improving Hcj. The entirely coated particles may be defined as coated particles each having the coating layer covering the entire surrounding surface of the individual particle.

The above-mentioned example shows the coverage ratio calculation performed when the individual particle 31 comprises the single main phase grain 31*a* as shown in FIG. 5A. Calculation of the coverage ratio when the individual particle 31 comprises an assemblage of multiple main phase grains 31*a* as shown in FIG. 5B can be performed in the same way.

When the main phase grains 31*a* are joined with the grain boundary phase 33 as shown in FIG. 5B for example, the assemblage of these main phase grains 31*a* is deemed to be the individual particle 31. Excluding the lengths of the interfaces (shown in dotted-lines) between the grain boundary phase 33 and the main phase grains 31*a*, the circumferential interface lengths Lb1 and Lb2 (shown in dashed-and-double-dotted lines) and the circumferential exposed lengths La1 and La2 (shown in solid lines) of the individual particle 31 are calculated through image analysis.

Although the individual particle 31 comprising the assemblage of the main phase grains 31*a* may be included in the magnet powder of the present embodiment, the mean coverage ratio is preferably within the above-mentioned range. Regarding sphericity P1 and sphericity P2, the sphericity of each main phase grain 31*a* is preferably within the above-mentioned range.

In the individual particle 31 comprising the assemblage of the main phase grains 31*a*, the grain boundary phase 33 comprises a component including a larger amount of rare-earth elements compared to the amount of rare-earth elements in the main phase grains 31*a*, as is the case with the coating layer 32, and has a composition similar to that of the coating layer 32. However, the components and the compositions of the coating layer 32 and the grain boundary phase 33 are not necessarily identical. The grain boundary phase 33 is defined as a portion in between the main phase grains 31*a*. The coating layer 32 is defined as a portion that covers an outer surface of one or more main phase grains 31*a* and does not touch any other outside main phase grains 31*a*, thus having an outer surface of the coating layer exposed to an outside.

The R-T-B based magnet powder according to the present embodiment can have sufficiently increased bulk density (aerated bulk density and packed bulk density). When the R-T-B based magnet powder is pressure molded in a magnetic field, despite being a fine magnet powder, flowability is less likely to decrease, and mold-filling ability is improved. Improvement of the mold-filling ability enables the magnet powder to fill a mold evenly, reducing unevenness of the density of a green compact and deformation of a sintered body.

The R-T-B based magnet powder according to the present embodiment can also have increased crystal orientation in the green compact. In other words, each particle in the magnet powder of the present invention can be easily oriented toward the magnetic field direction. An R-T-B based magnet having excellent magnetic properties can thus be obtained. Additionally, with reduced interparticle friction in the powder, the crystal orientation of the magnetic particles can be increased. Moreover, the magnetic properties of the magnet, such as the coercivity (Hcj), can be improved because the quantity proportion of the particles comprising a single crystal in the rare-earth-based magnet powder in the present embodiment is 65% or more.

Figure 6A:
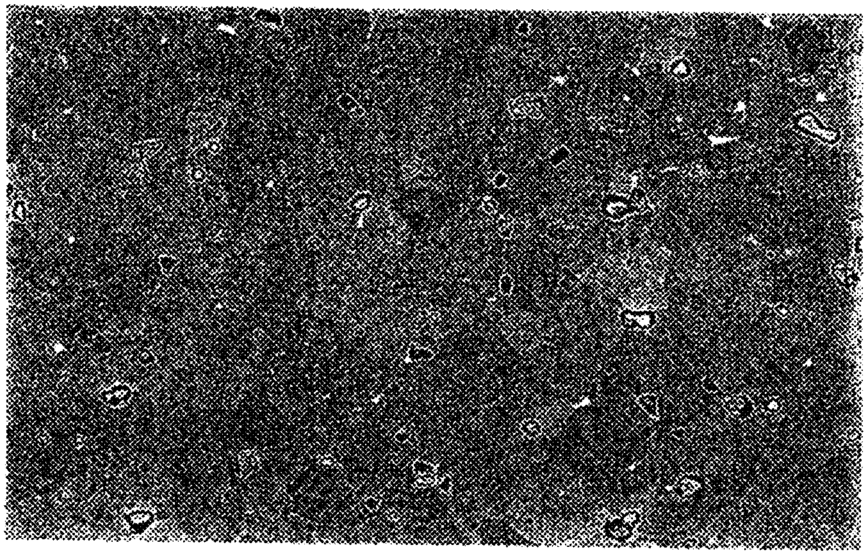
FIG. 6A is a photomicrograph of a cross section of a rare-earth-based sintered magnet according to an embodiment of the present invention.

From the perspective of allowing high magnetic properties and heat resistance, an R-T-B permanent magnet is preferably the sintered magnet. The sintered magnet preferably includes the sintered body obtained after the green compact formed with the above-mentioned rare-earth-based magnet powder in the magnetic field is sintered. As shown in FIG. 6A, a main phase and a subphase are preferably observed in a cross section of the sintered body, and the area proportion of the subphase is preferably 2% or less. The main phase is preferably the $R_2T_{14}B$ crystal. The sintered magnet has a crystal orientation of preferably 94% or more, and more preferably 95% or more, calculated by dividing the residual magnetic flux density in the orientation direction by the saturation magnetic flux density.

In the sintered magnet according to the present embodiment, the crystal orientation of the main phase and the residual magnetic flux density are improved. Additionally, with the subphase evenly distributed on the surface of the main phase, the coercivity of the sintered magnet is improved. Although the subphase tends to be distributed unevenly in between the main phase and another main phase, reducing the area proportion of the subphase can prevent reduction of the residual magnetic flux density. Reduced uneven distribution of the subphase component in the sintered body in the sintered magnet thus allows for high residual magnetic flux density and high coercivity at the same time.

The area proportion of the subphase can be calculated, for example, using a backscattered electron image obtained with a field emission scanning electron microscopy (FE-SEM). To use FE-SEM, a dedicated sample for FE-SEM is prepared first. Specifically, the R-T-B based permanent magnet is put into epoxy-based resin or phenol-based resin, and is polished so that a cross section parallel to the orientation direction of the R-T-B based permanent magnet can be observed. Regarding polishing, rough polishing using a normal method is performed, and then final polishing is performed. The final polishing is performed so that the cross-section has luster. A method of the final polishing is not limited to a specific one.

The final polishing is preferably dry polishing, in which a polishing solution (e.g., water) is not used. When the polishing solution (e.g., water) is used, it might not be possible to perform appropriate analysis due to corrosion of the boundary phase. Next, ion milling is performed on the polished cross section of the R-T-B based permanent magnet to remove an oxide layer, a silicon nitride layer, or the like.

The cross section of the R-T-B based permanent magnet is then observed using FE-SEM, and a backscattered electron image having a size of 50 μm squared or more to 100 μm squared or less is obtained at a magnification of 1000 or more to 3000 or less. From the contrast of the backscattered electron image, it can be confirmed that the R-T-B based permanent magnet comprises multiple types of phases. By comparing a result of point analysis using an energy-dispersive X-ray spectroscopy (EDS) attached to FE-SEM and the contrast of the backscattered electron image, the phases can be classified as a main phase crystal particle (main phase) comprising $R_2T_{14}B$ or a phase (subphase) such as an R-rich phase. Whether classified as the main phase crystal particle (main phase) or not can be determined using the EDS measurement result.

To calculate the area proportion of the subphase, image binarization is performed for the backscattered electron image. An area having a contrast that is brighter with a predetermined level than that of the main phase crystal particle is extracted from the backscattered electron image of the R-T-B based permanent magnet of the present embodiment, and is defined as the subphase area. For example, image binarization is performed for the backscattered electron image of the R-T-B based permanent magnet shown in FIG. 6A or FIG. 6B. By dividing the subphase area detected through binarization by the area of the R-T-B based permanent magnet, the area proportion of the subphase can be calculated.

The subphase (e.g., R-rich phase) generally includes a larger amount of a rare-earth element R compared to the main phase crystal particle. Here, the rare-earth element R is the element having an especially large atomic number among the elements normally included in the R-T-B based permanent magnet. Usually, the larger the amount of the element having the large atomic number, the stronger the signal strength of the backscattered electron image, and the brighter the image. In the present embodiment, the area proportion may be deemed to be equivalent to a volume proportion, and the volume proportion can be calculated instead.

The permanent magnet of the present embodiment may be, for example, the bonded magnet or a bonded magnet compound (e.g., in pellet form) in which the above-mentioned R-T-B based magnet powder is kneaded into resin. Using the rare-earth-based magnet powder of the present embodiment as the raw material powder of the bonded magnet (e.g., raw material powder included in the bonded magnet compound) allows for high filling rate and high crystal orientation, achieving the bonded magnet having high Br.

Hereinafter, a method of manufacturing the R-T-B based sintered magnet (R-T-B based permanent magnet) is described in detail.

<Method of Manufacturing the R-T-B Based Permanent Magnet>

The method of manufacturing the R-T-B based permanent magnet according to the present embodiment includes the following steps.

(a) Alloy preparation step in which a raw material alloy is prepared (b) Pulverization step in which the raw material alloy is pulverized (c) Spheroidizing step in which the pulverized raw material alloy powder is spheroidized (d) Molding step in which the spheroidized raw material powder is molded (e) Sintering step in which the green compact is sintered to obtain a preform of the R-T-B based permanent magnet (f) Machining step in which the R-T-B based permanent magnet preform is machined

[Alloy Preparation Step]

The raw material alloy of the R-T-B based permanent magnet according to the present embodiment is prepared. To prepare the raw material alloy having a desired composition, a raw material metal corresponding to the composition of the R-T-B based permanent magnet according to the present embodiment is melted in a vacuum or an inert gas (e.g., Ar gas) atmosphere, and then the melted raw material metal is used for casting. Although a one-alloy method is described in the present embodiment, a two-alloy method in which a main alloy and a sub alloy are individually prepared may be used.

For example, a rare-earth metal, a rare-earth alloy, pure iron, ferroboron, and their alloy or compound may be used as the raw material metal. A method of casting the raw material metal includes, for example, an ingot casting method, a strip casting method, a book molding method, and a centrifugal casting method. When the obtained raw material alloy has solidification segregation, the raw material alloy is homogenized as required.

[Pulverization Step]

After the raw material alloy is prepared, the raw material alloy is pulverized.

The pulverization step can include two steps. In a coarse pulverization step (step S1 shown in FIG. 3), the raw material alloy is pulverized until its particle diameter is about a several hundred μm to about a several mm. In a fine pulverization step (step S3 shown in FIG. 3), the coarsely pulverized raw material alloy is pulverized until its particle diameter is about a several μm.

(Coarse Pulverization Step)

Figure 3:
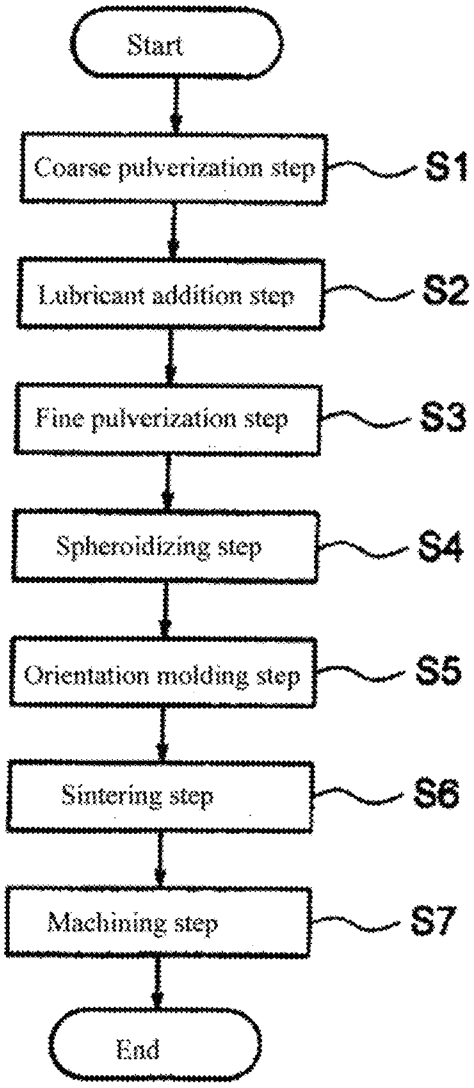
FIG. 3 is a flow chart showing a method of manufacturing the rare-earth-based magnet powder according to an embodiment of the present invention.

The raw material alloy is coarsely pulverized until each particle diameter is about a several hundred μm to about a several mm (step S1 shown in FIG. 3). A coarsely pulverized powder of the raw material alloy is thus obtained. In the coarse pulverization, hydrogen is stored in the raw material alloy, and then removed (dehydrogenation). This causes a self-collapsed type pulverization (hydrogen storage pulverization) based on a difference in a storable amount of hydrogen among different phases. The coarse pulverization step may be performed using a coarse pulverizer (e.g., a stamp mill, a jaw crusher, a brown mill) in an inert gas atmosphere for example, without using the above-mentioned hydrogen storage pulverization.

An atmosphere of each step from the pulverization step to the sintering step described later preferably has a low oxygen concentration to allow for high magnetic properties. The oxygen concentration is adjusted, for example, by controlling the atmosphere of each step. When the oxygen concentration of each step is high, a rare-earth element in the raw material alloy powder is oxidized to generate an R oxide to be deposited in a particle boundary without being reduced during sintering. This reduces the residual magnetic flux density (Br) of the R-T-B based permanent magnet to be obtained. Therefore, the oxygen concentration in each step is preferably 100 ppm or less, for example.

(Fine Pulverization Step)

Ater the coarse pulverization of the raw material alloy, the obtained coarsely pulverized powder of the raw material alloy is finely pulverized (step S3 shown in FIG. 3) until the mean particle diameter is about several μm. A finely pulverized powder of the raw material alloy is thus obtained. Further finely pulverizing the coarsely pulverized powder makes it possible to obtain the finely pulverized powder including particles having a diameter of preferably 1 μm or more to 10 μm or less, and more preferably 3 μm or more to 5 μm or less.

The fine pulverization is performed by further pulverizing the coarsely pulverized powder using a fine pulverizer (e.g., a jet mill, a ball mill, a vibrating mill, a wet attritor) while suitably adjusting conditions (e.g., pulverization time). When the jet mill is used, the pulverization method is as follows. The jet mill discharges an inert gas (e.g., $N_2$ gas) through a narrow nozzle at high pressure and produces a high-speed gas flow. Flow of the coarsely pulverized powder of the raw material alloy is accelerated with this high-speed gas flow. Thus, a collision between particles within the coarsely pulverized powder of the raw material alloy or a collision between the coarsely pulverized powder and a target or a container wall is caused.

Figure 1B:
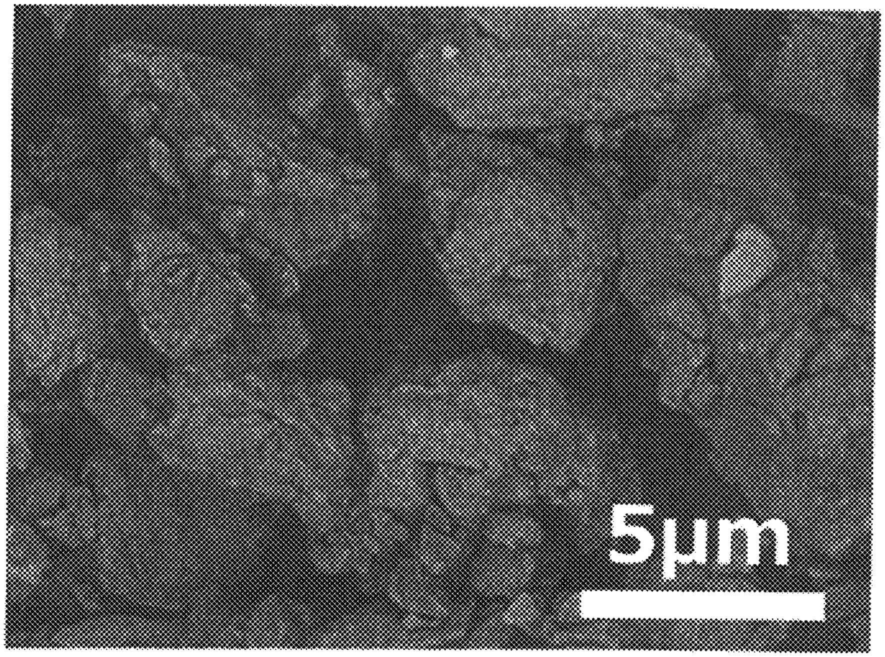
FIG. 1B is a photomicrograph of a rare-earth-based magnet powder according to a comparative example of the present invention.

Adding a pulverization aid (e.g., zinc stearate, oleic amide) (lubricant addition step or step S2 shown in FIG. 3) when finely pulverizing the coarsely pulverized powder of the raw material alloy enables the finely pulverized powder to have high crystal orientation when being molded. FIG. 1B shows an example of the R-T-B based magnet powder obtained in step S3 (fine pulverization step). The average value of sphericity P1, defined in the above-mentioned equation (1), of the R-T-B based magnet powder obtained in step S3 (fine pulverization step), is less than 0.65, and preferably 0.60 or less. The average value of sphericity P2, defined in the above-mentioned equation (2), of the R-T-B based magnet powder obtained in step S3 (fine pulverization step) is less than 0.70, and preferably 0.68 or less.

[Spheroidizing Step]

The spheroidizing step, or step S4 shown in FIG. 3, is performed next in the present embodiment. In the spheroidizing step, the finely pulverized powder produced in the fine pulverization step is spheroidized using an apparatus shown in FIG. 4, for example.

Figure 4:
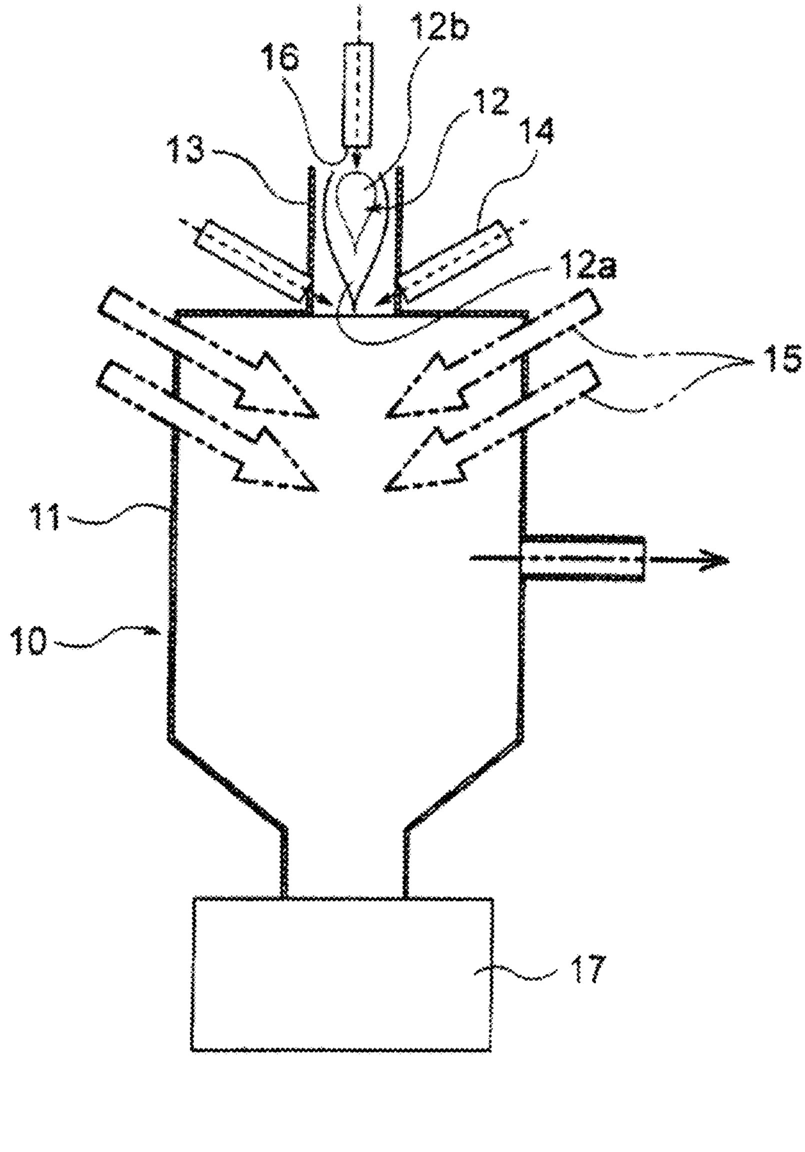
FIG. 4 is a schematic diagram of an apparatus used in a spheroidizing step shown in FIG. 3.

The apparatus 10 shown in FIG. 4 can produce high frequency induction thermal plasma 12 inside a plasma generation sub-chamber 13 at an upper central part of a chamber 11. The high frequency induction thermal plasma 12 is generated by concentrating high-frequency power locally and instantly changing various gases into extremely hot plasma having a temperature of about ten thousand degrees through electromagnetic induction at an atmospheric pressure or at a near-atmospheric pressure in a reduced-pressure atmosphere. By introducing raw materials (powder, gas, liquid) into the plasma 12 to induce vaporization, melting, decomposition, chemical reactions, and the like, a nanoparticle synthesis or reaction, reforming or spheroidizing of the fine powder, film formation, toxic gas decomposition, etc. can occur.

The plasma generation sub-chamber 13 is connected internally with the chamber 11 disposed below the plasma generation sub-chamber 13. Near a connection part between the plasma generation sub-chamber 13 and the chamber 11, a raw material powder supplying part 14 is connected. Through this part, a fine raw material powder is fed (sprayed) into a flame tip **12*a* of the thermal plasma 12**.

A high-frequency coil is disposed around the plasma generation sub-chamber 13. With this coil, high frequency induction heating is performed inside the plasma generation sub-chamber 13 to generate flame of the thermal plasma 12. High frequency and a voltage (or power) of a high-frequency voltage applied to the high-frequency coil are not limited and may be appropriately determined in accordance with properties such as a thermal plasma temperature.

For spheroidizing in the present embodiment, the fine raw material powder obtained in the fine pulverization step is heated using the thermal plasma. A plasma gas is turned into the thermal plasma having a temperature of about ten thousand degrees through high frequency induction, and the fine raw material powder is introduced into the plasma. The spheroidized raw material powder after the thermal plasma processing may be classified using a cyclone separator or the like. This high frequency induction thermal plasma method makes it possible to prepare the spheroidized raw material powder in an almost true spherical shape. It is permissible to spheroidize only a part of the fine raw material powder using the thermal plasma method, instead of all parts of the fine raw material powder.

In the present embodiment, it is more preferable to spray the fine raw material powder obtained in step S3 shown in FIG. 3 towards the flame tip 12*a* of the thermal plasma 12 in the apparatus 10 shown in FIG. 4. This prevents excessive vaporization or melting of the fine raw material powder, thus enabling the spheroidized fine raw material powder (the R-T-B based magnet powder of the present embodiment) having a mean particle diameter of about 0.5-20 μm to be easily obtained.

The particle diameter and particle diameter distribution of the spheroidized raw material powder can be controlled by controlling the particle diameter of the fine raw material powder, the amount of the fine raw material powder sprayed to the thermal plasma 12 per unit hour, a feed rate of a carrier gas, and the like. The flame tip 12*a* of the thermal plasma 12 is a part near the tip of the flame of the thermal plasma 12 (lower tip in the figure) and has a temperature of about 2000-5000K.

The temperature of the flame tip 12*a* is slightly low as thermal plasma. Feeding the fine raw material powder (alloy powder) into the area can prevent nanonization due to vaporization and coarsening due to excessive melting. When the raw material powder is fed from an upper portion (upstream side of the flame tip) of the thermal plasma, a larger amount of nanopowder tends to be generated, and the bulk density tends to decrease due to agglomeration of the nanopowder.

The raw material powder fed into the flame tip 12*a* is exposed to the high temperature in the flame tip 12*a* of the thermal plasma 12, and then cooled rapidly in an upper part of the chamber 11 using a rapid cooling gas 15. The powder is thus spheroidized. The atmosphere of the rapid cooling gas IS in the upper part of the chamber 11 is, for example, an inert atmosphere comprising argon or a reduced atmosphere comprising hydrogen-containing argon.

The plasma gas ejected from a gas ejection nozzle 16 above the plasma generation sub-chamber 13 is a mixture of a hydrogen gas and an argon gas. The plasma generation sub-chamber 13 has an internal pressure of preferably 700 Torr or less in a reduced-pressure atmosphere, as is the case with the inside of the chamber 11, and more preferably 75-675 Torr. Instead of the argon gas, or together with the argon gas, an inert gas (e.g., helium gas, nitrogen gas) may be used. The hydrogen gas is not necessarily included, but is preferably included. Instead of the hydrogen gas, oxygen or a hydrocarbon gas (e.g., methane, ethane, propane, butane, acetylene, ethylene, propylene, butene) may be used in accordance with an intended purpose.

The spheroidized powder spheroidized inside the chamber 11 is collected in a boxed-shape powder collection part 17 below the chamber 11. The spheroidized powder (the R-T-B based magnet powder of the present embodiment) collected in the powder collection part 17 is classified as necessary, and moved to an apparatus for performing an orientation molding step (step S5) shown in FIG. 3.

[Orientation Molding Step]

The R-T-B based magnet powder of the present embodiment shown in FIG. 1A is then molded into an intended shape. A green compact is thus obtained. In the molding step, the magnet powder is filled in a mold disposed between electromagnets, and molded into a freely-selected shape (step S5 shown in FIG. 3) with application of pressure. Applying a magnetic field while pressure is applied produces a predetermined orientation to the spheroidized powder. The powder is molded in the magnetic field with an oriented crystal axis. The obtained green compact is oriented to a particular direction, enabling the R-T-B based permanent magnet preform having strong anisotropy to be obtained.

[Sintering Step]

The green compact, molded into the intended shape in step S5 shown in FIG. 3, is then sintered (step S6) in a vacuum or an inert gas atmosphere. The R-T-B based permanent magnet is thus obtained. A sintering temperature needs to be adjusted in accordance with conditions (e.g., composition, pulverization method, differences in particle size and particle diameter distribution). The green compact is sintered, for example, through heating treatment in the vacuum or under the presence of the inert gas at a temperature of 1000° C. or more to 1200° C. or less for an hour or more to 10 hours or less. Through this, a liquid phase sintering of the spheroidized powder occurs, and the R-T-B based permanent magnet preform having an improved main phase volume ratio can be obtained. From the perspective of improving production efficiency, the R-T-B based permanent magnet preform after being sintered is preferably cooled rapidly.

To measure the magnetic properties at this timing, the aging treatment is performed. In the aging treatment, for example, the R-T-B based permanent magnet preform is held under a temperature lower than the sintering temperature, after being sintered. Conditions of the aging treatment are suitably adjusted in accordance with the number of times of performing the aging treatment. For example, the aging treatment may comprise two heating steps, which are heating at a temperature of 700'C or more to 900° C. or less for 1 to 3 hours and further heating at a temperature of 500° C. to 700° C. for 1 to 3 hours, or, may comprise one heating step, which is heating at a temperature of around 600° C. for 1 to 3 hours. The aging treatment as above can improve the magnetic properties of the R-T-B based permanent magnet preform. The aging treatment may be performed after the machining step.

After the aging treatment of the R-T-B based permanent magnet preform is performed, the R-T-B based permanent magnet preform is rapidly cooled in an Ar gas atmosphere. Through this, the R-T-B based permanent magnet preform according to the present embodiment is obtained. A cooling rate is not limited, and is preferably 30° C./min or faster.

The obtained R-T-B based permanent magnet preform may be machined into a desired shape as necessary (step S7 shown in FIG. 3). A machining method includes shaping (e.g., cutting, grinding) and chamfering (e.g., barrel polishing). Because the spheroidized powder (the R-T-B based magnet powder according to the present embodiment) is spheroidized in the spheroidizing step in the present embodiment, the powder has good flowability. Because the powder with good flowability is used for molding in the present embodiment, the powder can be molded using a mold having a shape close to that of a final product in the orientation molding step (step S5) shown in FIG. 3. In other words, a thin green compact, which has been conventionally difficult to achieve, can be achieved in the present embodiment. Consequently, in the machining step, the magnet preform after sintering can be productized without being cut. After the machining step, a diffusion step described below may be performed as necessary.

[Diffusion Step]

The heavy rare-earth element RH may be diffused in a boundary phase of the R-T-B based permanent magnet preform. As preprocessing of the boundary phase diffusion, an etching treatment is preferably performed for the magnet preform. Specifically, a mixed solution including 3 mass % nitric acid in 100 mass % ethanol is prepared, and the magnet preform is etched by being immersed in the mixed solution for three minutes and then cleaned by being immersed in ethanol for one minute.

Diffusion can be performed, for example, by adhering a compound including the heavy rare-earth element on the surface of the R-T-B based permanent magnet preform and then performing a heat treatment, or by performing the heat treatment for the R-T-B based permanent magnet preform in an atmosphere including vapor of a heavy rare-earth element.

A method of adhering the heavy rare-earth element RH is not limited. Examples of the method include, for example, vapor deposition method, sputtering, electrodeposition, spray application, brush application, jet dispensing, nozzle method, screen printing, squeegee printing, and sheet construction method.

While the heavy rare-earth element RH may be freely selected, Dy or Tb is preferably used, and Tb is particularly preferably used. For example, when Tb is diffused as the heavy rare-earth element RH, appropriately controlling the amount of Tb adhesion, a diffusion temperature, and diffusion time can bring out effects of diffusion more suitably.

When the heavy rare-earth element RH is adhered through application, applying a coating paste comprising a solvent and a heavy rare-earth compound including the heavy rare-earth element RH is common. A state of the coating paste is not limited. The heavy rare-earth compound may be freely selected. Some examples include an alloy, an oxide, a halide, hydroxide, and a hydride. The hydride is particularly preferably used.

To adhere a Tb compound, for example, Tb hydride ($TbH_2$), TB oxide ($Tb_2O_3$, $Tb_4O_7$), or Tb fluoride ($TbF_3$) may be adhered.

The heavy rare-earth compound is preferably in a form of particles. The heavy rare-earth compound has a mean particle diameter of preferably 100 nm to 50 μm, and more preferably 1 μm to 20 μm.

The solvent used for the coating paste can preferably disperse the heavy rare-earth compound evenly without dissolving it. For example, alcohol, aldehyde, or ketone is used. Ethanol is preferably used.

The amount of the heavy rare-earth compound in the coating paste is not limited. The amount may be 50 wt % to 90 wt %, for example. The coating paste may further include a component other than the heavy rare-earth compound as necessary. The coating paste may include, for example, a dispersant for preventing agglomeration of heavy rare-earth compound particles, a powder of a transition metal or a base metal, a powder mainly comprising a light rare-earth element, or the like.

In the diffusion step of the present embodiment, the number of sides of the R-T-B based permanent magnet preform to which the coating paste including the heavy rare-earth compound is adhered is not limited. For example, the coating paste may be applied to all sides or only to two sides which are the largest side and a side facing the largest side. Masking may be performed for the remaining sides as necessary. The sides on which the coating paste including the heavy rare-earth element is applied are preferably pole faces.

A Tb adhesion amount may be, for example, 0.2 wt % or more to 3.0 wt % or less in 100 wt % of the entire R-T-B based permanent magnet. A heating temperature during diffusion may be 800° C. or more to 950° C. or less. An amount of heating time during diffusion is preferably 1 hour or more to 30 hours or less. An atmosphere of the diffusion step is freely selected, but is preferably an Ar atmosphere.

[Aging Treatment Step]

After the diffusion step, the aging treatment may be performed for the R-T-B based permanent magnet. In the aging treatment, for example, the R-T-B based permanent magnet is held at a temperature lower than the diffusion temperature after the diffusion step. Conditions of the aging treatment are suitably adjusted in accordance with the number of times of performing the aging treatment. The aging treatment may be performed at a temperature of 450° C. or more to 700° C. or less for 0.5 hours or more to 4 hours or less, for example. The aging treatment can improve the magnetic properties of the R-T-B based permanent magnet. An atmosphere during the aging treatment is freely selected, but is preferably an Ar atmosphere.

[Cooling Step]

After the aging treatment is performed for the R-T-B based permanent magnet, the R-T-B based permanent magnet is cooled in an Ar gas atmosphere. The R-T-B based permanent magnet according to the present embodiment is thus obtained. A cooling rate is freely determined, and is 30° C./min or faster to 300° C./min or slower, for example.

[Surface Treatment Step]

In accordance with an intended purpose or intended properties, a surface treatment (e.g., plating, resin coating, oxidizing treatment, chemical conversion treatment) may be performed for the R-T-B based permanent magnet obtained through the above steps. The surface treatment step may be skipped.

The R-T-B based permanent magnet according to the present embodiment is magnetized using a normal method. A magnet product can thus be obtained.

By using the method of the present embodiment, it is possible to obtain the spheroidized powder having the same particle diameter as that of the fed raw material powder, in the spheroidizing step. By using the method, it is further possible to easily obtain the powder having a quantity proportion of the particles comprising a single crystal in the rare-earth-based magnet powder of 65% or more and to improve the magnetic properties, such as the coercivity (Hcj), of the magnet.

For example, by rapidly cooling the magnet powder after the raw material powder is fed into the flame tip of the thermal plasma and heated, each particle of the raw material powder is entirely or partly melted. The powder thus becomes easier to be spheroidized. Also, the component of the subphase becomes easier to be distributed evenly on the surface of the powder, making it easier for spherical coated particles to be formed. The spherical powder tends to allow for improvement of the bulk density and the crystal orientation.

In using the manufacturing method as above, the spherical powder tends to allow for improvement of the bulk density and the crystal orientation. The magnet after sintering thus tends to have high residual magnetic flux density. The component of the subphase becomes easier to be distributed evenly on the surface of the powder, making it easier for the spherical costed particles to be formed. When the component of the subphase is distributed on the surface of the powder evenly, the subphase is distributed (thinly and) evenly at the two-grain boundary upon densification alter sintering. This possibly prevents reduction of the residual magnetic flux density. By using the manufacturing method, it is further possible to easily obtain the powder having a quantity proportion of the particles comprising a single crystal in the rare-earth-based magnet powder of 65% or more and to improve the magnetic properties (e.g., coercivity) of the magnet.

The present invention is not limited to the above-described embodiment and can be modified variously within the scope of the present invention.

The rare-earth magnet powder of the present invention may go through a further refining step in which a composition is refined using the HDDR method, for example. By further performing the HDDR method for the rare-earth magnet powder of the present invention, it is possible to reduce a crystal size while basically maintaining a particle shape, particle diameter, and magnetic anisotropy, and to obtain the R-T-B based permanent magnet having high coercivity.

Various changes and various combinations of the R-T-B based permanent magnet of the above-mentioned embodiment are possible. Similarly, various changes and various combinations can be applied to other rare-earth-based magnets. For example, the R-T-B based permanent magnet is not limited to the one manufactured through sintering as described above. The R-T-B based permanent magnet may be manufactured through hot forming and hot working, instead of sintering.

When hot forming, in which pressure is applied while heating, is performed for a cold formed body obtained by molding the raw material powder at a room temperature, a pore in the cold formed body is eliminated, and the body can be densified without being sintered. Further, by performing hot extruding as hot working for the formed body obtained through hot forming, the R-T-B based permanent magnet having a desired shape and magnetic anisotropy can be obtained.

Use of the R-T-B based permanent magnet according to the present embodiment is freely determined. Examples of use include motors for electric vehicles and wind power generation.

Use of the rare-earth magnet powder of the present invention includes, for example, magnetic refrigeration, magnetic fluid, magnetic sheet, and magnetic recording, other than magnet molding.

EXAMPLES

Hereinafter, the present invention is described based on further detailed examples, but the present invention is not limited to these examples.

Example 1

To first obtain an R-T-B based magnet powder having a composition of Nd: 30.5, Al: 0.23, Co: 0.5, Cu: 0.06, Zr: 0.15, B: 1.01, and Fe: remainder (unit: wt %), a raw material alloy was casted using a strip casting (SC) method.

Hydrogen pulverization (coarse pulverization) was then performed for the raw material alloy by storing hydrogen in the raw material alloy at a room temperature and then dehydrogenating the alloy at 600° C. for one hour. A coarsely pulverized powder was thus obtained. An atmosphere of each step (fine pulverization and molding) from hydrogen pulverization treatment to sintering had an oxygen concentration of less than 50 ppm.

Next, 0.2 wt % of oleic amide was added to the coarsely pulverized powder of the raw material alloy as a pulverization aid, and then mixed with the powder using a Nauta mixer. Then, fine pulverization was performed with a high pressure $N_2$ gas using a jet mill. A finely pulverized powder having a mean particle diameter of 4.0 μm was thus obtained (fine pulverization step).

The finely pulverized powder thus obtained was then spheroidized as described below (spheroidizing step). Specifically, the finely pulverized powder was sprayed to a flame tip 12*a* of a thermal plasma 12 through a raw material powder supplying part 14 of an apparatus 10 shown in FIG. 4. TP-40020 NPS manufactured by JEOL Ltd. was modified and used as the apparatus 10. To feed the powder to the apparatus 10, TP-99010FDR manufactured by JEOL Ltd. was used as a powder feeder. The powder was fed at various feed rates into the generated thermal plasma.

A high-frequency voltage (about 4 MHz, about 6 kV) was applied to a high-frequency transmission coil for generating the thermal plasma 12. A mixed gas (argon: 100 l/min, hydrogen: 10 l/min) was used as a plasma gas ejected from a gas ejection no-le 16. An atmosphere of the thermal plasma 12 generated in a plasma generation sub-chamber 13 at the time was a reduced-pressure atmosphere of about 375 Torr.

The fine raw material powder, carried by a carrier argon gas with a rate of 5 l/min, was fed to the flame tip 12*a* of the thermal plasma 12. The feed rate was 15.0 g/min. The temperature of the flame tip 12*a* was about 2000-5000K. A rapid cooling gas 15 in the upper part of a chamber 11 was a reducing gas comprising hydrogen-containing argon.

A mean particle diameter, sphericity P1, and sphericity P2 of a spheroidized powder (magnet powder) collected in a powder collection part 17 were calculated using the above-mentioned methods. Table 1A shows the results. Additionally, a quantity proportion (single crystal magnet powder proportion) of main phase grains comprising a single crystal included in the magnet powder was calculated using the above-mentioned method. Table 1A shows the results. Moreover, a quantity proportion of the particles having a sphericity P1 of 0.9 or more in the magnet powder, and a quantity proportion of the particles having a sphericity P2 of 0.8 or more in the magnet powder, were calculated using the above-mentioned method. Table 1B shows the results.

Whether comprising a single crystal or not was determined using an EBSD analysis apparatus. The EBSD analysis apparatus can image a specified crystal face of each particle. When a single crystal face was observed in each particle in the image obtained using the EBSD analysis apparatus, the particle was deemed to be a monocrystal. When multiple crystal faces were observed in each particle in the image, the particle was deemed to be a polycrystal.

A bulk density of the magnet powder was calculated using the following method. In measurement of the bulk density, a powder property measurement apparatus (manufactured by Hosokawa Micron Corporation) was used to measure a packed bulk density (g/cm$^3$) and an aerated bulk density (g/cm$^3$). A sieve used had an opening of 710 μm, and a metal funnel used had an inner diameter of 0.8 cm. VIBRATION was performed at 2.0 (power supply: AC 100V, 50 Hz). Table 1B shows the results.

FIG. 1A shows a photomicrograph of the magnet powder obtained in Example 1. A mean coverage ratio of coated particles included in the magnet powder was further calculated using the above-mentioned method. Table 1B shows the results. Whether a coated particle having a coverage ratio of 100% was included was determined using the above-mentioned method. Table 1B shows the results.

Comparative Example 1

The magnet powder was obtained in the same manner as in Example 1, except that the spheroidizing step was not performed. The finely pulverized powder immediately after being finely pulverized with the high-pressure $N_2$ gas using the jet mill (fine pulverization step) was used as the magnet powder. The mean particle diameter, sphericity P1, sphericity P2, and the single crystal magnet powder proportion were calculated in the same manner as in Example 1. Table 1A shows the results.

Moreover, the quantity proportion of the particles having a sphericity P1 of 0.9 or more in the magnet powder, and the quantity proportion of the particles having a sphericity P2 of 0.8 or more in the magnet powder, were calculated as in Example 1. Table 1B shows the results. The bulk density of the magnet powder was further calculated in the same manner as in Example 1. Table 1B shows the results. FIG. 1B shows a photomicrograph of the magnet powder obtained in Comparative Example 1. Table 1B shows the mean coverage ratio of the coated particles included in the magnet powder and whether the coated particle having a coverage ratio of 100% was included.

Example 2

Except that the conditions of the fine pulverization step before the spheroidizing step were changed to obtain the finely pulverized powder having a mean particle diameter of 10.0 μm, the magnet powder was obtained in the same manner as in Example 1. The finely pulverized powder after being finely pulverized with the high-pressure $N_2$ gas using the jet mill (fine pulverization step) was fed into the flame tip 12*a* of the thermal plasma 12 in the same manner as in Example 1, and the spheroidized powder thus obtained was used as the magnet powder. The mean particle diameter, sphericity P1, sphericity P2, and the single crystal magnet powder proportion were calculated in the same manner as in Example 1. Table 1A shows the results.

Moreover, the quantity proportion of the particles having a sphericity P1 of 0.9 or more in the magnet powder, and the quantity proportion of the particles having a sphericity P2 of 0.8 or more in the magnet powder, were calculated in the same manner as in Example 1. Table 1B shows the results. The bulk density of the magnet powder was further calculated in the same manner as in Example 1. Table 1B shows the results. Table 1B further shows the mean coverage ratio of the coated particles included in the magnet powder and whether the coated particle having a coverage ratio of 100% was included.

Comparative Example 2

Except that the spheroidizing step was not performed, the magnet powder was obtained in the same manner as in Example 2. The finely pulverized powder immediately after being finely pulverized with the high-pressure $N_2$ gas using the jet mill (fine pulverization step) was used as the magnet powder. The mean particle diameter, sphericity P1, sphericity P2, and the single crystal magnet powder proportion were calculated in the same manner as in Example 2. Table 1A shows the results.

Moreover, the quantity proportion of the particles having a sphericity P1 of 0.9 or more in the magnet powder, and the quantity proportion of the particles having a sphericity P2 of 0.8 or more in the magnet powder, were calculated in the same manner as in Example 2. Table 1B shows the results. The bulk density of the magnet powder was further calculated in the same manner as in Example 1. Table 1B shows the results. Table 1B further shows the mean coverage ratio of the coated particles included in the magnet powder and whether the coated particle having a coverage ratio of 100% was included.

Comparative Example 3

Except that the finely pulverized powder after the fine pulverization step was fed to an upper part 12*b* (see FIG. 4) of the thermal plasma 12 in the spheroidizing step, the magnet powder was obtained in the same manner as in Example 1. A central part of the thermal plasma 12 had a temperature of 10000K or higher. The mean particle diameter, sphericity P1, sphericity P2, and the single crystal magnet powder proportion were calculated in the same manner as in Example 1. Table 1A shows the results.

Moreover, the quantity proportion of the particles having a sphericity P1 of 0.9 or more in the magnet powder, and the quantity proportion of the particles having a sphericity P2 of 0.8 or more in the magnet powder, were calculated in the same manner as in Example 1. Table 1B shows the results. The bulk density of the magnet powder was further calculated in the same manner as in Example 1. Table 1B shows the results. Table 1B further shows the mean coverage ratio of the coated particles included in the magnet powder and whether the coated particle having a coverage ratio of 100% was included.

Comparative Example 4

Except that the finely pulverized powder after the fine pulverization step was fed to the upper part 12*b* (see FIG. 4) of the thermal plasma 12 in the spheroidizing step, the magnet powder was obtained in the same manner as in Example 2. The central part of the thermal plasma 12 had a temperature of 10000K or higher. The mean particle diameter, sphericity P1, sphericity P2, and the single crystal magnet powder proportion were calculated in the same manner as in Example 2. Table 1A shows the results.

Moreover, the quantity proportion of the particles having a sphericity P1 of 0.9 or more in the magnet powder, and the quantity proportion of the particles having a sphericity P2 of 0.8 or more in the magnet powder, were calculated in the same manner as in Example 2. Table 1B shows the results. The bulk density of the magnet powder was further calculated in the same manner as in Example 2. Table 1 B shows the results. Table 1B further shows the mean coverage ratio of the coated particles included in the magnet powder and whether the coated particle having a coverage ratio of 100% was included.

Comparative Example 5

Except that the magnet powder having a composition similar to that of Example 1 was formed using a gas atomization method without using the strip casting (SC) method and that the spheroidizing treatment using the thermal plasma was not performed, the magnet powder was obtained in the same manner as in Example 1. The mean particle diameter, sphericity P1, sphericity P2, and the single crystal magnet powder proportion were calculated in the same manner as in Example 1. Table 1A shows the results.

Moreover, the quantity proportion of the particles having a sphericity P1 of 0.9 or more in the magnet powder, and the quantity proportion of the particles having a sphericity P2 of 0.8 or more in the magnet powder, were calculated in the same manner as in Example 1. Table 1B shows the results. The bulk density of the magnet powder was further calculated in the same manner as in Example 1. Table 1B shows the results. Table 1B further shows the mean coverage ratio of the coated particles included in the magnet powder and whether the coated particle having a coverage ratio of 100% was included.

Examples 3-5

Except that an atmosphere pressure of the thermal plasma generated in the plasma generation sub-chamber 13 was changed to 675 Torr, 300 Torr, and 75 Torr in the spheroidizing step in Examples 3, 4, and 5 respectively, the magnet powders were obtained in the same manner as in Example 1. The mean particle diameter, sphericity P1, sphericity P2, and the single crystal magnet powder proportion of each example were calculated in the same manner as in Example 1. Table 1A shows the results.

Moreover, the quantity proportion of the particles having a sphericity P1 of 0.9 or more in each magnet powder, and the quantity proportion of the particles having a sphericity P2 of 0.8 or more in each magnet powder, were calculated in the same manner as in Example 1. Table 1B shows the results. The bulk density of each magnet powder was further calculated in the same manner as in Example 1. Table 1B shows the results. Table 1B further shows the mean coverage ratio of the coated particles included in each magnet powder and whether the coated particle having a coverage ratio of 100% was included.

Evaluation 1

As shown in Tables 1A and 1B, it was confirmed that, in each of Examples 1-5, both sphericity P1 and sphericity P2 were higher, the bulk density was higher, the quantity proportion of the particles having a sphericity P1 of 0.9 or more was higher, and the quantity proportion of the particles having a sphericity P2 of 0.8 or more was higher, than in Comparative Examples 1-4. It was also confirmed that the mean particle diameter of the magnet powder was able to be controlled within a preferable range. It was further confirmed that it was possible to control the particle diameter and the particle diameter distribution of the spheroidized raw material powder (magnet powder), the single crystal magnet powder proportion, and the mean coverage ratio by controlling the particle diameter of the fine raw material powder, the amount of the fine raw material powder sprayed (fed) to the thermal plasma per unit hour, the amount of the carrier gas, and the internal pressure of the plasma generation sub-chamber, and the like.

Additionally, as shown in Tables 1A and 1B, it was confirmed that, in each of Examples 1-5, the average coverage ratio (mean coverage ratio) of the particles constituting the magnet powder was higher and the particle having a coverage ratio of 100% was observed, in comparison to Comparative Examples 1-5. It was confirmed that high coverage ratio resulted in high magnetic properties of the magnet, as described later.

A reason why the mean particle diameter was small in Comparative Example 3 may be as follows. When particles having a small diameter were fed from the upper part 12*b* of the thermal plasma 12, the particles entirely vaporized due to excessive heat applied by going through the plasma having a temperature of several tens of thousand degrees. The vaporized particles resolidified, generating a nanopowder. Because the particles having small diameters were easily agglomerated, agglomeration of the generated nanopowder occurred, and the shape of the particles was distorted. Additionally, many particles having an amorphous shape were generated in the resolidification, possibly lowering the sphericity.

When particles having large diameters were fed from the upper part 12*b* of the thermal plasma 12 in Comparative Example 4, liquefaction of the particles occurred due to heat applied to the particles going through the plasma having a temperature of several tens of thousand degrees. Those particles in liquid form combined together and formed oversize particles. As a result, it is assumed that the particles in the powder after the spheroidizing step became large, with a mean particle diameter of 25.6 μm. It is also assumed that, compared to particles having small diameters, the oversize particles in liquid form took longer time to resolidify, during which agglomeration of the particles occurred, thus forming particles with low sphericity.

In Comparative Example 4, agglomeration of the particles occurred during the resolidification. Consequently, the internal composition of the particles constituting the powder in Comparative Example 4 was different from that of Examples 1-5. In Comparative Example 4, particles (e.g., individual particle 31 shown in FIG. 5B) each comprising two or more crystal grains were easily formed. In Examples 1-5, each of the particles constituting the powder was assumed to be a monocrystal (e.g., individual particle 31 shown in FIG. 5A), and was preferably a single crystal main phase grain 31*a* having a mean particle diameter of preferably 1-10 μm (more preferably 3-10 μm).

In Comparative Example 5, the sphericity was a little lower than in Examples 1-5, while the single crystal magnet powder proportion was extremely lower than in Examples 1-5. Also, the magnet powder in Comparative Example 5 had a larger mean particle diameter than in Examples 1-5. Further, in Comparative Example 5, the mean coverage ratio of the magnet powder was lower than in Examples 1-5, and a coated particle having a coverage ratio of 100%, was not observed. Therefore, as described later, a permanent magnet in which the magnet powder of Comparative Example 5 was used had lower magnetic properties than when the powders of Examples 1-5 were used.

Examples 11-14, Comparative Examples 11 and 12

Figure 6B:
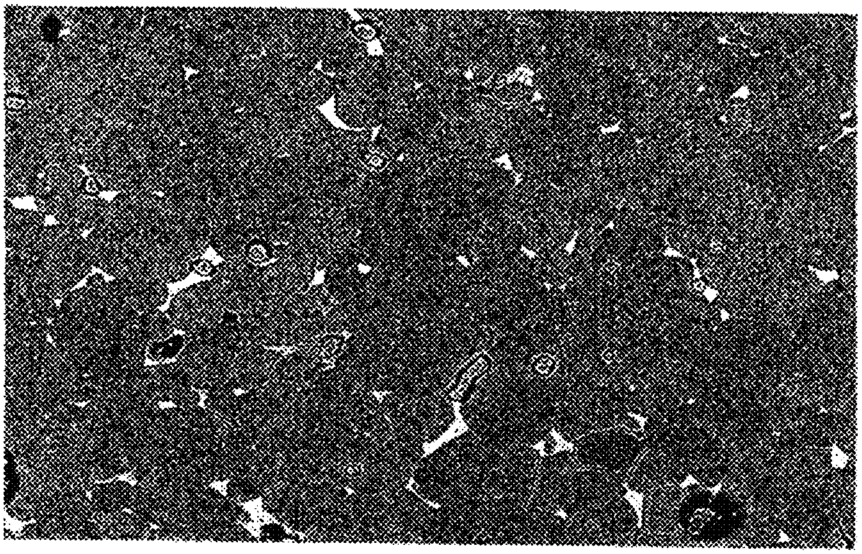
FIG. 6B is a photomicrograph of a cross section of a rare earth-based sintered magnet according to a comparative example of the present invention.

Using each magnet powder of the above-mentioned Examples 1 and 3-5 and Comparative Examples 1 and 5, the orientation molding step and the sintering step described in the above embodiment were performed to prepare permanent magnet samples comprising a sintered body. An area proportion of a subphase in each magnet sample was calculated. Table 2 shows the results. Residual magnetic flux density (Br), coercivity (Hcj), and crystal orientation (Br/Js) were also calculated. Table 2 shows the results. In the measurement of these magnetic properties, a B-H tracer and an X-ray diffraction (XRD) analysis apparatus were used. FIG. 6A shows a FE-SEM photomicrograph of a cross section of the sintered magnet sample obtained in Example 11. FIG. 6B shows a FE-SEM photomicrograph of a cross section of the sintered magnet sample obtained in Comparative Example 11.

Evaluation 2

It was confirmed that, in Examples 11-14, the residual magnetic flux density (Br), coercivity (Hcj), and crystal orientation (Br/Js) improved in accordance with the decrease in the area proportion of the subphase, in comparison to Comparative Examples 11 and 12. It is assumed that the residual magnetic flux density (Br) improved as a result of improvement of the filling rate and the crystal orientation due to the use of the magnet powder having high sphericity. It is also assumed that the coercivity (Hcj) improved because reversal of magnetization was less likely to occur due to the use of main phase grains comprising a single crystal covered with a coating layer comprising an R-rich phase with high magnetic anisotropy. The coating layer of each main phase grain in the examples was extremely thin and even. Therefore, the presence of the coating layer did not increase the area proportion of the subphase in the cross section of the sintered body after sintering, and the area proportion of the subphase in the examples was preferably 2% or less, and more preferably 1% or less.

In the alloy prepared using the strip casting method to manufacture the magnet powder as in Comparative Example 1 (Comparative Example 11), a dendrite comprising an R-rich phase is generated and composition polarization might occur in a particle. Sintering and densifying this particle generates more subphases (grain-boundary triple junction) in the sintered magnet structure due to the effects of the R-rich phase polarized in the particle as shown in FIG. 6B, for example.

On the other hand, regarding the magnet powder to which the plasma treatment was performed as in Example 1 (Example 11) for example, the magnet powder melted because the magnet powder was fed into the high-temperature plasma, and structural unevenness was not formed. This made it possible to obtain the magnet powder with even structure (spheroidized powder). It is assumed that, as a result, after sintering, generation of the subphases (grain-boundary triple junction) comprising the R-rich phase is prevented as shown in FIG. 6A, and obtaining the sintered magnet having high main phase proportion becomes possible.

Examples 21 and 22 and Comparative Examples 21 and 22

Each magnet powder obtained in Examples 4 and 5 and Comparative Examples 1 and 5 shown in Table 3 was kneaded into polyphenylene sulfide resin to prepare bonded magnet compounds first. Each of these compounds into which each magnet powder was kneaded was used to prepare each bonded magnet sample. In the same manner as in Examples 11-14, the residual magnetic flux density (Br) and the coercivity (Hcj) of each bonded magnet sample were calculated. Table 3 shows the results.

Evaluation 3

It was confirmed that, in Examples 21 and 22, the residual magnetic flux density (Br) and the coercivity (Hcj) were higher than in Comparative Examples 21 and 22. It is assumed that the residual magnetic flux density (Br) improved as a result of improvement of the filling rate due to the use of the magnet powder having high sphericity. It is also assumed that the coercivity (Hcj) improved because reversal of magnetization was less likely to occur due to the use of the main phase grains comprising the single crystal covered with the coating layer comprising the R-rich phase with high magnetic anisotropy.

TABLE 1A

| | Powder properties before spheroidiziug step Particle diameter of fine raw material powder | Spheroidizing step | | | | Powder properties | | | |
|---|---|---|---|---|---|---|---|---|---|
| | | Whether spheroidizing step is | Powder feed | Powder feed rate | Internal pressure of plasma generation sub-chamber | Sphericity | | Mean particle diameter | Single crystal magnet powder proportion |
| | (μm) | included | position | (g/min) | (Torr) | P1 | P2 | (μm) | % |
| Example 1 | 4.0 | Included | Flame tip | 15.0 | 375 | 0.79 | 0.77 | 4.2 | 76 |
| Example 2 | 10.0 | Included | Flame tip | 15.0 | 375 | 0.79 | 0.76 | 9.9 | 65 |
| Example 3 | 4.0 | Included | Flame tip | 15.0 | 675 | 0.77 | 0.76 | 4.5 | 72 |
| Example 4 | 4.0 | Included | Flame tip | 15.0 | 300 | 0.79 | 0.77 | 4.2 | 82 |
| Example 5 | 4.0 | Included | Flame tip | 15.0 | 75 | 0.80 | 0.79 | 4.1 | 89 |
| Comparative Example 1 | 4.0 | Not included | — | — | — | 0.56 | 0.68 | 4.0 | 73 |
| Comparative Example 2 | 10.0 | Not included | — | — | — | 0.57 | 0.68 | 10.0 | 62 |
| Comparative Example 3 | 4.0 | Included | Upper part | 15.0 | 375 | 0.53 | 0.61 | 0.2 | 75 |
| Comparative Example 4 | 10.0 | Included | Upper part | 15.0 | 375 | 0.59 | 0.69 | 25.6 | 24 |
| Comparative Example 5 | — | Not included | — | — | — | 0.69 | 0.76 | 14.0 | 14 |

TABLE 1B

| | Spheroidizing step | | | | Powder properties | | | | | |
|---|---|---|---|---|---|---|---|---|---|---|
| | Whether spheroidizing step is included | Powder feed position | Powder feed rate (g/min) | Internal pressure of plasma generation sub-chamber (Torr) | Packed bulk density ($g/cm^3$) | Aerated bulk density ($g/cm^3$) | Proportion of R-T-B based magnet powder having sphericity P1 of 0.9 or more % | Proportion of R-T-B based magnet powder having sphericity P2 of 0.8 or more % | Mean coverage ratio % | Whether magnet powder having a coverage ratio of 100% is included |
| Example 1 | Included | Flame tip | 15.0 | 375 | 4.1 | 2.2 | 43 | 35 | 66 | Included |
| Example 2 | Included | Flame tip | 15.0 | 375 | 4.1 | 2.1 | 42 | 36 | 52 | Included |
| Example 3 | Included | Flame tip | 15.0 | 675 | 3.9 | 2.0 | 40 | 32 | 61 | Included |
| Example 4 | Included | Flame tip | 15.0 | 300 | 4.1 | 2.2 | 45 | 35 | 72 | Included |
| Example 5 | Included | Flame tip | 15.0 | 75 | 4.2 | 2.4 | 50 | 41 | 82 | Included |
| Comparative Example 1 | Not included | — | — | — | 2.9 | 1.5 | 7 | 6 | 23 | Not included |
| Comparative Example 2 | Not included | — | — | — | 2.9 | 1.4 | 6 | 6 | 22 | Not included |
| Comparative Example 3 | Included | Upper part | 15.0 | 375 | 3.4 | 1.7 | 27 | 16 | 38 | Not included |
| Comparative Example 4 | Included | Upper part | 15.0 | 375 | 3.1 | 1.6 | 29 | 16 | 35 | Not included |
| Comparative Example 5 | Not included | — | — | — | 3.2 | 1.6 | 32 | 26 | 38 | Not included |

TABLE 2

| | | | Microstructure Subphase area | Magnetic properties | | Degree of orientation |
|---|---|---|---|---|---|---|
| | | Magnet powder | proportion (%) | Br (kG) | Hcj (kOc) | Br/Js (%) |
| Example 11 | Sintered body | Example 5 | 0.5 | 14.9 | 14.1 | 96 |
| Example 12 | Sintered body | Example 4 | 0.9 | 14.8 | 14.1 | 95 |
| Example 13 | Sintered body | Example 1 | 1.8 | 14.8 | 14.0 | 95 |
| Example 14 | Sintered body | Example 3 | 2.0 | 14.6 | 13.9 | 94 |
| Comparative Example 11 | Sintered body | Comparative Example 1 | 3.3 | 14.1 | 12.6 | 91 |
| Comparative Example 12 | Sintered body | Comparative Example 5 | 3.1 | 14.2 | 12.8 | 92 |

TABLE 3

| | | Magnet powder | Br (kG) | Hcj (kOe) |
|---|---|---|---|---|
| Example 21 | Bonded magnet | Example 5 | 10.2 | 4.2 |
| Example 22 | Bonded magnet | Example 4 | 10.1 | 3.1 |
| Comparative Example 21 | Bonded magnet | Comparative Example 1 | 8.5 | 0.6 |
| Comparative Example 22 | Bonded magnet | Comparative Example 5 | 9.0 | 0.9 |

DESCRIPTION OF THE REFERENCE NUMERALS

2 . . . particle of R-T-B based magnet powder (rare-earth-based magnet powder)
10 . . . apparatus
11 . . . chamber
12 . . . thermal plasma
12*a* . . . flame tip
12*b* . . . upper part
13 . . . plasma generation sub-chamber
14 . . . raw material powder supplying part
15 . . . rapid cooling gas
16 . . . gas ejection nozzle
17 . . . powder collection part
20 . . . perfect circle
30, 30*a* . . . coated particle
31 . . . individual particle
31*a* . . . main phase grain
32 . . . coating layer
33 . . . boundary phase

What is claimed is:

1. A rare-earth-based magnet powder whose average value of sphericity P1 defined by an equation (1) of P1=Ls/Ll is 0.65 or more, comprising coated particles including single crystal particles each consisting of a single main phase grain and having a surrounding surface at least partly covered with a coating layer, wherein Ll in the equation (1) is a length of a long side of a rectangle that circumscribes the rare-earth-based magnet powder in a photomicrograph so that an area of the rectangle is minimized;

Ls in the equation (1) is a length of a short side of the rectangle that circumscribes the rare-earth-based magnet powder in the photomicrograph so that the area of the rectangle is minimized;

a quantity proportion of the single crystal particles in the rare-earth-based magnet powder is 65% or more;

a mean particle diameter of the rare-earth-based magnet powder is 0.5-10 μm;

the coating layer comprises a rare-earth rich component having a higher concentration of rare-earth elements than a concentration of the main phase grain; and the quantity proportion of the rare-earth-based magnet powder having the sphericity P1 of 0.9 or more is 30% or more.

2. The rare-earth-based magnet powder according to claim 1, wherein the single crystal particles include an entirely coated particle having the coating layer covering the entire surrounding surface of the particle.

3. The rare-earth-based magnet powder according to claim 1, wherein an average of the coverage ratios indicating a proportion of the surrounding surface of each of the single crystal particles covered with the coating layer is 50% or more.

4. The rare-earth-based magnet powder according to claim 1, wherein the rare-earth-based magnet powder includes an R-T-B based magnet powder.

5. A bonded magnet including the rare-earth-based magnet powder according to claim 1.

6. A bonded magnet compound including the rare-earth-based magnet powder according to claim 1.

* * * * *